United States Patent [19]

Smillie

[11] 4,352,856

[45] Oct. 5, 1982

[54] SHAPED RIGID ARTICLES CONTAINING FLY ASH AND RESIN

[75] Inventor: John G. Smillie, Aurora, Ill.

[73] Assignee: Aurora Industries, Inc., Montgomery, Ill.

[21] Appl. No.: 32,270

[22] Filed: Apr. 23, 1979

[51] Int. Cl.$^3$ .................... B32B 5/16; B32B 27/00; C08G 51/04
[52] U.S. Cl. ............................... 428/329; 106/288 B; 106/DIG. 1; 264/109; 264/123; 264/DIG. 49; 428/330; 428/331; 428/403; 428/689
[58] Field of Search ............. 428/403, 174, 407, 323, 428/329, 330, 331, 689; 264/DIG. 49, 123, 109, 119, 128; 106/DIG. 1, 288 B

[56] References Cited

U.S. PATENT DOCUMENTS 3,830,776  8/1974  Carlson et al. ............. 106/DIG. 1
3,991,005  11/1976  Wallace ..................... 106/DIG. 1

*Primary Examiner*—Paul J. Thibodeau
*Attorney, Agent, or Firm*—Leydig, Voit, Osann, Mayer & Holt, Ltd.

[57] ABSTRACT

A method of manufacturing shaped rigid articles comprises preparing a mixture of thermally stable particulate material and a liquid resin having a viscosity of less than about 10 Stokes to form a thin coating of resin on the particles, at least a major portion of the particulate material comprising fly ash spheres, and forming the resulting mixture into a preselected shape with the resin bonding the particles together to form a rigid article having the preselected shape and containing less about 15% by weight resin. A rigid article also preferably has a cold tensile strength of at least about 125 psi.

11 Claims, No Drawings

SHAPED RIGID ARTICLES CONTAINING FLY ASH AND RESIN

DESCRIPTION OF THE INVENTION

The present invention relates generally to rigid articles made of a particulate material and a resin binder, and particularly to such articles in which a major portion of the particulate material is fly ash spheres.

It is a primary object of the present invention to provide an economical method of manufacturing rigid articles comprising fly ash spheres and a resin binder and having relatively high tensile strength, particularly in relationship to the amount of resin used.

It is another object of this invention to provide rigid articles comprising fly ash spheres and a resin binder, and exhibiting a relatively high tensile strength for any given resin content.

A further object of the invention is to provide such articles which also offer other desirable properties such as incombustibility, good structural integrity, and reasonable acoustical properties.

Yet another object of the invention is to provide such articles which are of extremely light weight.

Other objects and advantages of the invention will be apparent from the following detailed description and illustrative examples.

In accordance with the present invention, there is provided a method of manufacturing rigid articles with preselected shapes, the method comprising the steps of preparing a mixture of thermally stable particulate material and a liquid resin having a viscosity of less than about 10 Stokes to form a thin coating of resin on the particles, at least a major portion of the particulate material comprising fly ash spheres, and forming the resulting mixture into a preselected shape with the resin bonding the particles together to form a rigid article with the preselected shape and containing less than about 15% by weight resin. The resulting article formed by this invention preferably has a cold tensile strength of at least about 150 psi.

This invention stems from the discovery that the coating of fly ash spheres with only small amounts of resin in the form of a low viscosity liquid results in a product with unexpectedly high tensile strength after the resin is solidified. Rather than reducing in proportion to reductions in the resin content, the tensile strength remains relatively high with resin contents below 15%, and even below 10%, by weight of the final product. Indeed, it has been found that the tensile strength per unit weight of resin actually increases at resin levels below 15% by weight, particularly below 10% by weight, and/or at viscosities below 10 Stokes, particularly below 5 Stokes. Consequently, such products can be made at a relatively low cost because of the low resin content, which is typically the most expensive ingredient in compositions of this type. And yet the strength of the product is sufficiently high to permit it to be used in numerous applications where substantial structural strength is required.

Although it is not intended to limit the invention to any particular theory, it is believed that the low viscosity liquid resin forms an extremely thin coating on the fly ash spheres, and these coated spheres pack closely together so that the thin resin coatings on adjacent spheres can unite and form a strong inter-particle bond. As a result, the final product has a relatively high tensile strength even when only small amounts of resin are used.

The fly ash particles that are used in this invention are not only spherical but also hollow and, therefore, have a low density. These spheres are a common constituent of fly ash as obtained from most sources, and are separated from the heavier solid constituents by well known and commercially practiced processes using selective flotation. For example, fly ash spheres available from Fillite U.S.A. Inc. of Huntington, W. Va., under the designation "Fillite" have a specific gravity of less than 0.7 and a particle diameter in the range of 5 to 300 microns. Similar fly ash spheres are available from P.A. Industries Inc. of Chatanooga, Tenn., under the designation "Extendospheres." As is well known, fly ash is composed primarily of silica and alumina with a small amount of iron oxide and alkali metal oxides, and has a high melting point, e.g., 1200° C.

If desired, other particulate and/or fibrous materials can be mixed with the fly ash spheres, provided the fly ash spheres constitute at least about 50% of the non-resin content of the final product. Examples of other suitable particulate or fibrous materials that can be mixed with the fly ash to vary the properties of the final product are vermiculite, perlite, grog, calcined rice hulls, graphite, rock wool, asbestos, fiberglass, glass or plastic microspheres and the like.

The resin that is used as the binder in this invention must be available in liquid form with a viscosity of less than about 10 Stokes. It is preferred that the liquid resin be stable at room temperature so that the fly ash and the resin can be mixed without the use of heaters, and also to permit room temperature storage of the liquid resin. The liquid resin can be formed by dissolving solid resin in a solvent, by dispersing extremely fine particles of solid resin in a liquid carrier, or by the use of a resin which is normally in a liquid state before it is set.

Several different resins that are suitable for use in this invention will be described below by way of examples, but it should be understood that the invention is applicable to most resins that are available as liquids with the proper viscosity and that will form a substantially continuous coating on each individual fly ash particle upon thorough mixing. The setting of the resin is preferably effected by the use of warm air which drives off the liquid solvent or carrier and/or raises the temperature of the resin to its setting point, or at least accelerates the setting. With certain resins, a catalyst is mixed with the resin in its liquid form to promote the setting of the resin, as in the case of certain of the exemplary resins to be described below.

To facilitate the forming of the fly ash-resin mixture into the desired shape, the liquid resin and the fly ash are preferably mixed in proportions that produce a dough-like mass that is still moldable but will not run. This mass is then formed into the desired shape, normally by molding, and finally the resin is set and dried to form the desired rigid article. With certain resins, such as phenol formaldehyde dissolved in alcohol, the resin-coated fly ash can be dried as a particulate material, e.g., by subjecting the fly ash to heated air to a temperature or by sustained mixing at room temperature, before it is formed into the desired shape. The coated fly ash is then subsequently put in a mold or pattern with the desired shape and heated to a temperature in the range of 400° to 500° F. to soften and cure the resin and thereby bond the fly ash into the desired shape. Here again, specific examples of these mixing and forming processes will be described in more detail below.

Examples of liquid resins that are suitable for use in this invention are phenol formaldehyde resin dissolved in ethyl alcohol and mixed with hexamethylenetetramine as a catalyst (e.g., "Plenco 212" resin made by Plastic Engineering Company; solutions of alkyd base resins (e.g., "Linocure" resin made by Ashland Chemical Co. of Columbus, Ohio); solutions of phenolic urethane resins (e.g., "6100/6300" resin made by Ashland Chemical Co.); and furan resins which are normally in a liquid state at room temperature and thus do not require a solvent (e.g., "Chem Rez 290" resin made by Ashland Chemical Co.).

The rigid shaped articles of this invention are particularly useful in applications requiring light weight, imcombustible, rigid cores, such as building panels faced with thin sheets of metal, wood or plastic; furniture cores; fire doors and the like.

The following working examples are given as illustrations and are not intended to limit the scope of the invention. The tests referred to in the examples were conducted substantially in accordance with the following procedures:

COLD TENSILE STRENGTH

A Dietert #400-1 motor driven, arc type strength machine (made by Harry W. Dietert Co., Detroit, Mich.) with Dietert #610-N tensile core strength accessory is used to break specimen "biscuits". The cold tensile strength in psi is read directly from the shear scale on the machine.

LOSS ON IGNITION

Two grams of the material to be tested are placed in a pre-weighed boat with a cover, and the boat and material are then placed in a muffle furnace maintained at 1700° F. and heated for 45 minutes. The boat and material are then removed from the furnace, allowed to cool to room temperature, and weighed again. The final weight of the boat and material is substracted from the initial weight of the boat and material, and the resulting difference is divided by 2 and multiplied by 100 to obtain the percent loss on ignition.

COMPRESSIVE STRENGTH

A Dietert #400-1 motor driven, arc type strength machine (made by Harry W. Dietert Co., Detroit, Mich.) with Dietert #410 high dry strength accessory. Specimens are cylinders 2 inches high and 2 inches in diameter.

EXAMPLE NOS. 1–4

200 pounds of fly ash and stated amounts of a standard hexamethylenetetramine/calcium stearate blend were mixed in a conventional Fordath mixer at room temperature. After 30 seconds of mixing the stated amounts of a solution of phenol formaldehyde resin in ethanol (resin solids content 50% by weight, viscosity of 1 to 2 Stokes) were added. Mixing was then continued for one minute, after which air heated to 450° F. was introduced to the mixer to evaporate the solvents. Mixing was then continued for another 7–9 minutes to form a mixture in which the agglomerates started to crumble. This mixture was then discharged from the mixer, screened and dried. Specimen "biscuits" for testing were formed in a pattern at 450° F., cured for one minute, cooled to room temperature, and then tested for cold tensile strength ("C.T.") and loss on ignition ("L.O.I."), with the following results:

|       | Liquid Resin | Hexa/C.S. | L.O.I. | C.T.    | C.T./Resin |
|-------|--------------|-----------|--------|---------|------------|
| No. 1 | 23# 9 oz.    | 2# 4 oz.  | 7.1%   | 85 psi  | 12.0       |
| No. 2 | 43# 10 oz.   | 4# 3 oz.  | 11.6%  | 138 psi | 11.9       |
| No. 3 | 63# 13 oz.   | 6# 2 oz.  | 17.5%  | 192 psi | 11.0       |
| No. 4 | 84#          | 8#        | 20.0%  | 225 psi | 11.3       |

EXAMPLE NOS. 5–6

For purposes of comparison with Examples 1–4, the same procedure was repeated using the same resin but in a solution containing 70% resin solids (viscosity of 50 Stokes), with the following results:

|       | Liquid Resin | Hexa/C.S. | L.O.I. | C.T.    | C.T./Resin |
|-------|--------------|-----------|--------|---------|------------|
| No. 5 | 16# 14 oz.   | 2# 4 oz.  | 6.2%   | 53 ps.  | 8.5        |
| No. 6 | 45# 12 oz.   | 6# 2 oz.  | 16.0%  | 168 psi | 10.5       |

EXAMPLE NOS. 7–8

600 grams of fly ash were mixed in a Hobart mixer with the stated amounts of an alkyd base liquid resin ("Linocure" made by Ashland Chemical Co.) containing 80% by weight resin solids in a solvent and having a viscosity of 4.38 Stokes. The mixing was continued until the fly ash was thoroughly wetted (about 4 minutes), forming a doughy mass which was formed into specimen "biscuits" in a pattern at room temperature, cured for 24 hours at room temperture, and then tested for cold tensile strength ("C.T.") with the following results:

|       | Liquid Resin | % Resin | C.T. | C.T./Resin |
|-------|--------------|---------|------|------------|
| No. 7 | 150 gm.      | 20%     | 558  | 27.9       |
| No. 8 | 60 gm.       | 8%      | 413  | 51.6       |

EXAMPLE NOS. 9–14

The procedure of Examples 7–8 was repeated using 600 grams of fly ash and the stated amounts of a phenolic urethane liquid resin ("6100/6300" resin made by Ashland Chemical Co.) containing 70% by weight resin solids in a solvent and having a viscosity of 0.5 Stokes. This was a three-part resin, so part A (30 grams) was added first along with the catalyst, mixed about 2 minutes, and then part B (30 grams) was added and mixed for another 2 minutes. The resulting doughy mass was formed into specimen "biscuits" in a pattern at room temperature, cured for 24 hours at room temperature, and then tested for cold tensile strength ("C.T.") and compressive strength ("Comp.") with the following results:

|        | Liquid Resin | % Resin | C.T.    | C.T./Resin | Comp.   |
|--------|--------------|---------|---------|------------|---------|
| No. 9  | 36 gm.       | 4.2%    | 160 psi | 38.1       | 550 psi |
| No. 10 | 48 gm.       | 5.6%    | 224 psi | 40.0       | 684 psi |
| No. 11 | 60 gm.       | 7.0%    | 242 psi | 34.6       | 804 psi |
| No. 12 | 72 gm.       | 8.4%    | 286 psi | 34.0       | 831 psi |
| No. 13 | 90 gm.       | 10.5%   | 292 psi | 27.8       | 825 psi |

-continued

|  | Liquid Resin | % Resin | C.T. | C.T./Resin | Comp. |
|---|---|---|---|---|---|
| No. 14 | 120 gm. | 14.0% | 296 psi | 21.1 | 969 psi |

EXAMPLE NOS. 15-17

The procedure of Examples 15-17 was repeated using the stated amounts of a furan liquid resin ("Chem Rez 290" resin made by Ashland Chemical Co.) comprising 100% resin with a viscosity of 0.75 Stokes. The resulting doughy mass was formed into specimen "biscuits" in a pattern at room temperature, cured for 24 hours at room temperature, and then tested for cold tensile strength, with the following results:

|  | Liquid Resin | % Resin | C.T. | C.T./Resin |
|---|---|---|---|---|
| No. 15 | 60 gm. | 10% | 412 psi | 41.2 |
| No. 16 | 45 gm. | 7.5% | 220 psi | 29.3 |
| No. 17 | 30 gm. | 5% | 160 psi | 32.0 |

As can be seen from the foregoing examples, for any given resin the tensile strength obtained per unit weight of resin generally increases markedly as the resin content drops below about 15% by weight and/or as the viscosity of the liquid resin drops. This trend is particularly noticeable at resin contents below 10% by weight and viscosities below 5 Stokes. For example, comparing Examples 1-4 with Examples 5-6, it can be seen that the tensile strength per unit weight of resin decreased significantly when the 70% resin solution (50 Stokes) was used instead of the 50% resin solution (1-2 Stokes). Examples 7-8 show an even greater change in the tensile strength per unit weight of resin at resin levels of 8% and 20% by weight.

While the invention has been described with reference to certain preferred embodiments, it is not intended to limit the invention to the details of these particular embodiments. On the contrary, it is intended to cover all equivalents, modifications and alternatives which fall within the spirit and scope of the invention as defined by the appended claims.

I claim as my invention:

1. A method of manufacturing shaped rigid articles, said method comprising the steps of
   preparing a mixture of thermally stable particulate material and a liquid resin having a viscosity of less than about 10 Stokes to form a thin coating of resin on said particles, at least a major portion of said particulate material comprising hollow fly ash spheres, and
   forming the resulting mixture into a preselected shape with said resin bonding said particles together to form a rigid article of said preselected shape containing less than about 15% by weight resin and in which a major portion of said particulate material still comprises hollow fly ash spheres.

2. A method of manufacturing shaped rigid articles as set forth in claim 1 wherein said rigid article has a cold tensile strength of at least about 125 psi.

3. A method of manufacturing shaped rigid articles as set forth in claim 1 wherein said mixture of particulate material and liquid resin is dried to form a solid coating of said resin on the individual fly ash spheres and any other particulate material in said mixture, prior to the forming of said mixture into said preselected shape, and said resin is melted and solidified again during said forming step to bond said particles together.

4. A method of manufacturing shaped rigid articles as set forth in claim 3 wherein said liquid resin is initially dried on the particles of fly ash to form resin-coated particulate material, and subsequently forming said coated material into said preselected shape, heating said coated material to soften the resin, and curing the resin to bond the particulate material into a rigid article having said preselected shape.

5. A method of manufacturing shaped rigid articles as set forth in claim 1 wherein the proportions of particulate material and liquid resin in said mixture are selected to produce a doughy mass which can be formed into said preselected shape.

6. A shaped rigid article comprising a mixture of thermally stable particulate material and less than about 15% by weight resin, said resin coating each individual particle and bonding said particles together, at least a major portion of said particulate material comprising hollow fly ash spheres, and said resin coating being formed from a liquid resin having a viscosity of less than about 10 Stokes.

7. A shaped rigid article as set forth in claim 6 which has a cold tensile strength of at least 125 psi.

8. A method of manufacturing shaped rigid articles as set forth in claim 1 wherein said article contains less than 10% by weight resin.

9. A method of manufacturing shaped rigid articles as set forth in claim 1 wherein said resin has a viscosity of less than about 5 Stokes.

10. A shaped rigid article as set forth in claim 6 which contains less than about 10% by weight resin.

11. A shaped rigid article as set forth in claim 6 wherein said resin coating is formed from a liquid resin having a viscosity of less than about 5 Stokes.

* * * * *